US 8,561,389 B2

(12) United States Patent
Rehling

(10) Patent No.: US 8,561,389 B2
(45) Date of Patent: Oct. 22, 2013

(54) SYSTEM FOR INERTING A VOLUME IN A VEHICLE

(75) Inventor: Bernd Rehling, Achim (DE)

(73) Assignee: Airbus Operations GmbH, Hamburg (DE)

( * ) Notice: Subject to any disclaimer, the term of this patent is extended or adjusted under 35 U.S.C. 154(b) by 356 days.

(21) Appl. No.: 12/913,467

(22) Filed: Oct. 27, 2010

(65) Prior Publication Data

US 2011/0094205 A1 Apr. 28, 2011

Related U.S. Application Data

(60) Provisional application No. 61/255,400, filed on Oct. 27, 2009.

(30) Foreign Application Priority Data

Oct. 27, 2009 (DE) .......................... 10 2009 050 749

(51) Int. Cl.
*F01N 5/00* (2006.01)

(52) U.S. Cl.
USPC ................... 60/281; 60/274; 60/278; 60/311; 60/315; 60/320

(58) Field of Classification Search
USPC ........... 60/272, 274, 279, 281, 297, 298, 311, 60/315, 320, 324
See application file for complete search history.

(56) References Cited

U.S. PATENT DOCUMENTS

| | | | | |
|---|---|---|---|---|
| 2,392,711 A | * | 1/1946 | Willenborg | 422/129 |
| 2,737,249 A | * | 3/1956 | Pinkel et al. | 169/45 |
| 2,889,955 A | * | 6/1959 | Naulty et al. | 220/88.3 |
| 4,681,602 A | | 7/1987 | Glenn et al. | |
| 4,827,716 A | | 5/1989 | Vershure, Jr. | |
| 4,984,426 A | | 1/1991 | Santi | |
| 6,012,533 A | * | 1/2000 | Cramer | 169/45 |
| 6,014,858 A | * | 1/2000 | Zankowski | 60/274 |
| 6,122,908 A | * | 9/2000 | Wirmark | 60/274 |
| 6,901,743 B2 | * | 6/2005 | Asanuma et al. | 60/281 |
| 7,430,858 B2 | * | 10/2008 | Hoff, Jr. | 60/309 |
| 2003/0051887 A1 | | 3/2003 | Cramer | |

FOREIGN PATENT DOCUMENTS

| | | | |
|---|---|---|---|
| DE | 3840407 A1 | 11/1988 | |
| DE | 19845955 A1 | 10/1998 | |
| DE | 10240379 A1 | 9/2002 | |
| EP | 0340545 A2 | 11/1989 | |
| GB | 2326592 * | 12/1998 | 60/281 |
| GB | 2326592 A | 12/1998 | |
| WO | 2009059837 A1 | 5/2009 | |

OTHER PUBLICATIONS

German Office Action for Application No. 10 2009 050 749.3-22 mailed Feb. 24, 2010.

* cited by examiner

*Primary Examiner* — Binh Q Tran
(74) *Attorney, Agent, or Firm* — Ingrassia Fisher & Lorenz P.C.

(57) ABSTRACT

A system is provided for inerting a volume in a vehicle has at least one exhaust gas extraction point on at least one internal combustion engine of the vehicle, and exhaust gas line for routing exhaust gas from the exhaust gas extraction point to the volume, and at least one exhaust gas inlet on the volume for introducing exhaust gas to generate a low-activity environment in the volume. Precisely in vehicles with internal combustion engines, using exhaust gas for inerting a volume makes it possible to suggest an especially simple, cost-effective and robust solution to guard against the formation of an ignitable mixture in the volume or the like.

13 Claims, 4 Drawing Sheets

SYSTEM FOR INERTING A VOLUME IN A VEHICLE

REFERENCE TO RELATED APPLICATIONS

This application claims the benefit of the filing date of and claims priority to German Patent Application No. 10 2009 050 749.3 filed Oct. 27, 2009 and of U.S. Provisional Patent Application No. 61/255,400 filed Oct. 27, 2009, which are incorporated herein by reference in their entirety.

TECHNICAL AREA

The technical field relates to inerting a gas volume. In particular, the invention relates to a system for inerting a gas volume, a method for inerting a gas volume, a vehicle with such an inerting system, and the use of such a system in a vehicle.

BACKGROUND

Inerting a volume refers to the procedure of adding low-activity (inert) gases or vapors in atmospheric oxygen, or expelling and replacing ignitable gas mixtures from a closed volume in order to create a low-activity environment in a volume, for example to avert the danger of explosion or fire. For example, fire prevention could be accomplished by expelling atmospheric oxygen out of the volume by means of noble gases, such as argon or nitrogen, or carbon dioxide, thereby averting an explosive atmosphere.

A variety of different systems and methods exist for use in commercial aircraft. For example, inerting systems are known in which an air separation module is used to divide air, e.g. from an aircraft cabin, into an oxygen-enriched and an oxygen-depleted volume flow, wherein the oxygen-depleted share is introduced of the free volume of the aircraft fuel tank. This oxygen-depleted volume flow exhibits primarily nitrogen, and expels the atmospheric oxygen necessary to form an explosive mixture out of the free gas volume into the fuel tank. Further known is the use of ignition spark weakening means (so-called "ignition mitigation means", IMM), which are used in the form of a polyurethane foam, a foam rubber or the like in fuel tanks of some military aircraft, e.g., the USAF F-15 Eagle and Navy F/A 18 Hornet to prevent explosions. However, the approximately 10-20% reduction in fuel volume might be problematical here, along with maintenance, which encompasses the removal of foam at each tank opening, the storage of contaminated foam, as well as health, safety and environmental aspects. In addition, the fuel tank volume must be recalibrated, and the additional weight of the foam must be taken into account. Consideration must also be given to the fact that the use of foam has not been approved for civilian aircraft.

Also conceivable is the use of nitrogen for introduction into a free volume of a fuel tank, wherein the nitrogen could be entrained in the form of several gas bottles, although the latter would have to be routinely replaced or refilled, and also increase the weight of the aircraft at the same time. There is always a potential risk of explosion associated with the installation of pressurized gas bottles in a vehicle as well.

In view of the properties of the systems and methods known in the art for inerting a gas volume in a vehicle, there may be a need for a new type of system and method for inerting a volume that has both a mechanically simple design and low weight, and is largely maintenance-free. At the same time, there may be a need for the kind of inerting system that requires no replacement or refilling of fuel, while at the same time also not posing any risk to aircraft safety. In addition, other needs, desirable features and characteristics will become apparent from the subsequent summary and detailed description, and the appended claims, taken in conjunction with the accompanying drawings and this background.

SUMMARY

A first embodiment of the present invention involves combining an exhaust gas extraction point on at least one internal combustion engine of the vehicle, at least one exhaust gas line for routing from the exhaust gas extraction point to the volume to be inerted, and at least one exhaust gas supply point at the volume to be inerted in order to introduce exhaust gas for establishing a low-activity atmosphere in the volume.

Since the overwhelming majority of vehicles in service today are powered by internal combustion engines, the system according to an embodiment of the invention may be used in a majority of vehicles. The first embodiment according to the invention eliminates the requirement of providing a separate source for an inert gas, or takes the complicated step of preparing an initial product, since the exhaust gas produced by an internal combustion engine represents a source for an oxygen-depleted gas.

The specific type of internal combustion engine is completely irrelevant, since all known internal combustion engines burn a fuel with oxygen to produce mechanical power in the process. It may be assumed in the modern internal combustion engines in service today that combustion is ideal, so that the share of oxygen in the exhaust gas emitted into the environment is close to zero.

How the exhaust gas extraction point is realized is equally irrelevant. The objective of the exhaust gas extraction point is to divert at least part of the exhaust gas stream from the internal combustion engine being directed to the environment, so that the system may use it for inerting the volume. In this case, an extraction point may conceivably be situated on an exhaust gas outlet of the internal combustion engine, designed as a branch line, valve or the like. This extraction point could be provided with an exhaust gas line, which supplies the removed partial volume flow of exhaust gas to the volume to be inerted.

An exhaust gas supply point on the volume to be inerted is especially advantageous for introducing the exhaust gas at a predetermined and defined position, since the volume to be inerted in the fuel tank always lies between the upper side of the fuel located in the tank and the boundary of the fuel tank lying above that. The volume to be inerted should be filled with inert gas starting from its upper side.

The system according to an embodiment of the invention proposes a mechanically simple solution for inerting a defined volume, in which no fuels need to be refilled or replaced, wherein it is concurrently practically maintenance free, and a sufficient quantity of inert gas or inert gas mixture may always be expected. The weight of the system is low, since at least the basic structure of the system has no active mechanical components that might otherwise help increase the weight of standard inerting systems encountered in prior art. By using exhaust gas lines with a small cross section, low line thickness and low specific weight, the weight may be held to the lowest possible level.

Another embodiment of the system according to the invention provides a cleaning filter, which is used to clean the exhaust gas, and, for example, prevents particles from being introduced into the volume to be inerted that come about either during combustion in the internal combustion engine, or introduced from the environment with the air necessary for combustion. In particular when using the system in a fuel tank, this makes it possible to mitigate any deterioration in quality of the fuel located therein by particles, in addition to which no additional suspended solids or the like accumulate on the floor of the fuel tank, which are introduced with the fuel tank nearly empty via corresponding fuel extraction points of the internal combustion engine. The cleaning filter is preferably arranged in proximity to the exhaust gas extraction point, so that no particles accumulate in the adjacent exhaust gas line. As known in modern land vehicles, the cleaning filter could also have a thermal cleaning function in which the accumulated particles are subjected to catalytic combustion, thereby yielding a continuous filtering action.

Just as advantageously, an exhaust gas cooler could be arranged in the system, which reduces the thermal load on the exhaust gas line, especially given relatively warm exhaust gases. If the volume to be inerted is located in a fuel tank, this makes it possible to avoid a temperature in the fuel tank that might potentially trigger an ignition. This is the case in particular while initializing the inerting process, when point a combustible fuel-gas mixture could have accumulated in the volume, which is expelled from the volume when starting up the vehicle.

At the same time, it is especially advantageous to integrate a compressor into the system, since in longer exhaust gas lines, the pressure applied to the exhaust gas line might not be enough to traverse longer distances to the volume to be inerted or initiate an introduction into the volume. The compressor is preferably situated in proximity to the exhaust gas extraction point, and could generate enough pressure to completely introduce the exhaust gas into the volume.

When using a compressor, it makes sense to reduce the energy required by providing an additional pressure accumulator, which is located downstream from the compressor and may be used as a buffer storage for the compressed exhaust gas. Even though the compressor could be deactivated once a predetermined fill level of the pressure tank has been reached, this still enables the introduction of exhaust gas into the volume to be inerted, or a pressurization of the volume.

It is just as advantageous to integrate at least one first pressure relief valve into the system, which is used to avoid excess pressure in the exhaust gas line. The first pressure relief valve preferably has a conductor gland or the like, which as the pressure relief valve opens relays the exhaust gas streaming through into the vehicle environment. This makes it possible to prevent the passenger compartment from being exposed to exhaust gas, thereby reliably avoiding any impairment to the health of any passengers on board the vehicle.

It is also preferred to provide outlet valves on the volume to be inerted, which enable an exchange of the gas in the volume to be inerted. This outlet valve could preferably be actuated via an electronic unit or the like, so that, for example, when starting up the vehicle, the outlet valve is opened, the gas in the volume may be rapidly exchanged, and the outlet valve may be closed again after the exchange. For example, if the volume to be inerted involves the free region in a fuel tank not filled with fuel, this makes it possible to create a non-combustible environment in the fuel tank relatively quickly. By permanently exposing the fuel tank to an exhaust gas pressure, the slowly increasing volume inside the fuel tank is continuously filled with the exhaust gas as fuel is consumed. The outlet valve may secondarily also be used to avoid excess pressure in the gas volume to be inerted by having an electronic unit open the outlet valve if a predetermined pressure in the volume is exceeded. In parallel or as an alternative, a second pressure relief valve arranged on the volume to be inerted may be provided, which could be used to relieve pressure.

When using the system in commercial aircraft, it must be remembered that fuel tanks are usually ventilated, so that the removal of fuel does not produce a vacuum in the fuel tank. This means that the outlet valves might not be absolutely necessary there.

In another embodiment, the system according to the invention is suitable for use in a modern commercial aircraft, wherein the exhaust gas extraction point is set up to remove exhaust gas from at least one internal combustion engine of the aircraft. For example, if the internal combustion engine is a gas turbine, an exhaust gas extraction point could conceivably be on a turbine stage. One would here have to make sure and tap an exhaust gas relaxed as sufficiently as possible with an uncritical exhaust gas pressure, which additionally has the least damaging temperature possible. However the exhaust gas pressure should also be sufficient to operate the system without the help of a compressor. It would also be conceivable to tap exhaust gas from two different turbine stages, and mix the separate partial streams at a ratio to be determined, so as to obtain an exhaust gas in the best possible state. The system is here not limited to tap one or more turbine stages in the main engines of an aircraft, since correspondingly tapping an auxiliary engine (APU, "auxiliary power unit") would also be conceivable and expedient.

A corresponding external source on ground may also be used to introduce inert gases into the tanks, if required. The aircraft is provided with corresponding connecting elements to this end, so as to enable an external supply of the inerting system.

The above need may also be met by a method according to the invention for inerting a volume. The essential steps in the method according to the invention involve extracting an exhaust gas from the internal combustion engine of the vehicle, optionally filtering and/or compressing this exhaust gas, and then supplying it to the inerting gas volume.

The need may further be met by using exhaust gas from at least one internal combustion engine of a vehicle for inerting a volume.

BRIEF DESCRIPTION OF THE FIGURES

Additional features, advantages and possible applications of the present invention may be gleaned from the following description of the exemplary embodiments and the figures. All described and/or graphically depicted features here constitute the subject matter of the invention whether taken alone or in any combination, even independently of their composition in the individual claims or references thereto. In addition, the same reference numbers in the figures represent identical or similar objects, where:

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
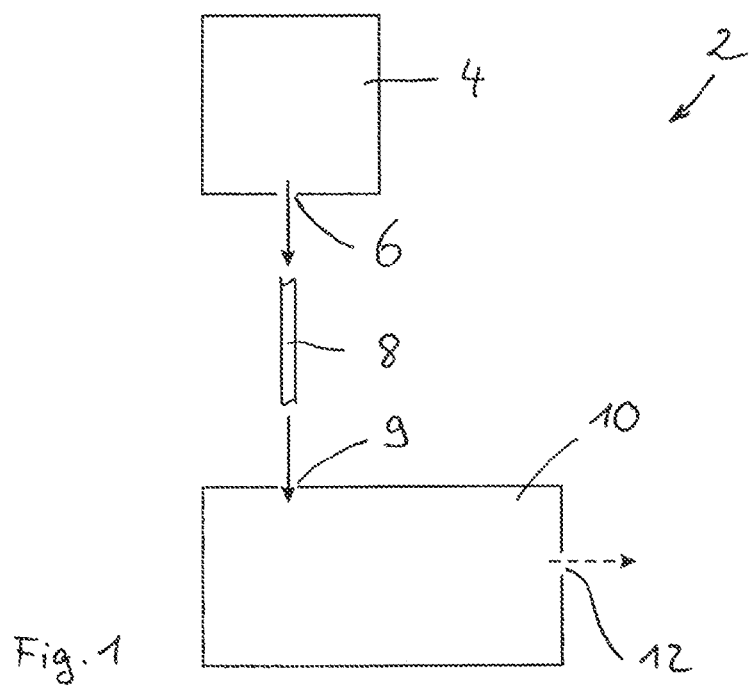
FIG. 1 shows a diagrammatic view of the system according to the invention based on a first exemplary embodiment.

FIG. 1 depicts the most fundamental structure of a system 2 according to an embodiment of the invention. Shown here is an internal combustion engine 4 of an aircraft, which has an exhaust gas extraction point 6 for tapping exhaust gas from an exhaust gas stream. The tapped exhaust gas is routed through an exhaust gas line 8 into an exhaust gas inlet 9 of a volume 10 to be inerted. This minimizes a general reactivity by reducing or eliminating a share of oxygen in the volume 10.

In light of the continuous, alternating or successive introduction of exhaust gas into the volume 10, it would be very advantageous to provide the volume 10 an outlet 12 through which an expelled gas present in the volume 10 before introducing the exhaust gas may escape. For example, this gas could be the air present in the volume 10 when initializing the inerting process, or a fuel-air mixture if the volume 10 is the fuel tank of a vehicle.

The advantage of the system according to the invention lies in the reuse of a waste product in the form of exhaust gas from an internal combustion engine 4, which would otherwise only be discharged into the environment.

Figure 2:
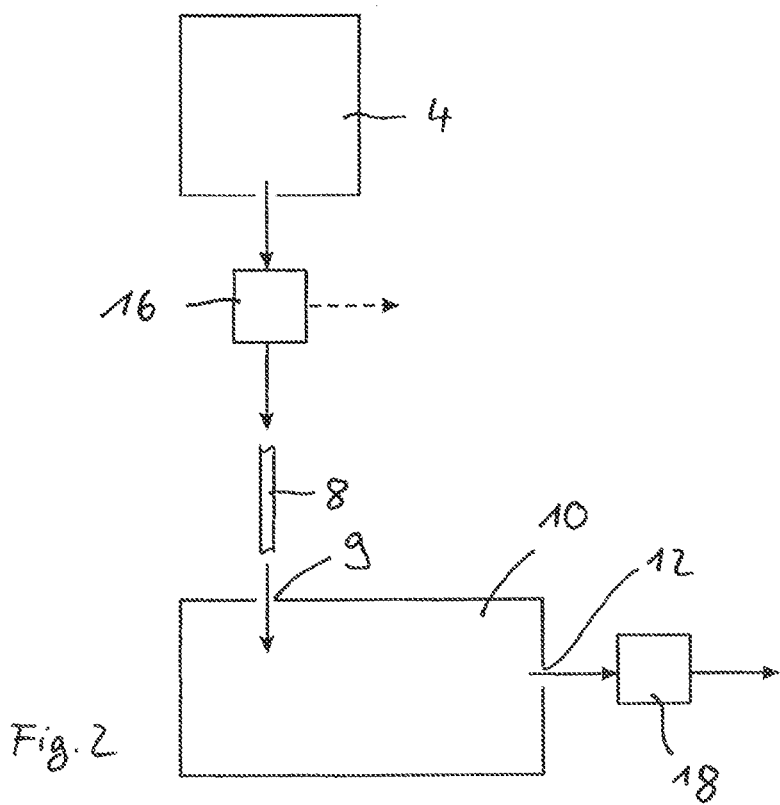
FIG. 2 shows a diagrammatic view of the system according to the invention based on a second exemplary embodiment.

FIG. 2 shows a slight modification in the form of a system 14 according to an embodiment of the invention. The internal combustion engine 4 is here coupled by a valve 16 with the exhaust gas line 8, which introduces exhaust gas into the volume 10. The connection between the exhaust gas extraction point 6 and the volume 10 may be separated with the vehicle not in operation in the exemplary embodiment of the fuel tank so as to prevent a fuel-gas mixture from getting into the internal combustion engine 4 via the exhaust gas line 8, or a combustible mixture from being present in the exhaust gas line 8 and posing a certain danger when starting up the vehicle. As an alternative to the above, the valve 16 could also be designed as a first pressure relief valve, which may prevent a pressure that the exhaust gas line 8 may absorb from being exceeded. The dashed line represents the exhaust gas discharged into the environment.

In the exemplary embodiment shown, the outlet 12 is also connected with a valve 18, which could be used, for example, to enable an exchange of gas in the volume 10 solely to initialize the inerting process, only to be closed again thereafter. If the volume 10 is established in a fuel tank between the upper side of the fuel and upper boundary of the fuel tank, an exhaust gas pressure will always be pending after exchanging the volume 10, causing exhaust gas to subsequently flow continuously into the volume 10 being slowly increased by fuel consumption, thereby preventing the formation of an ignitable mixture.

Figure 3:
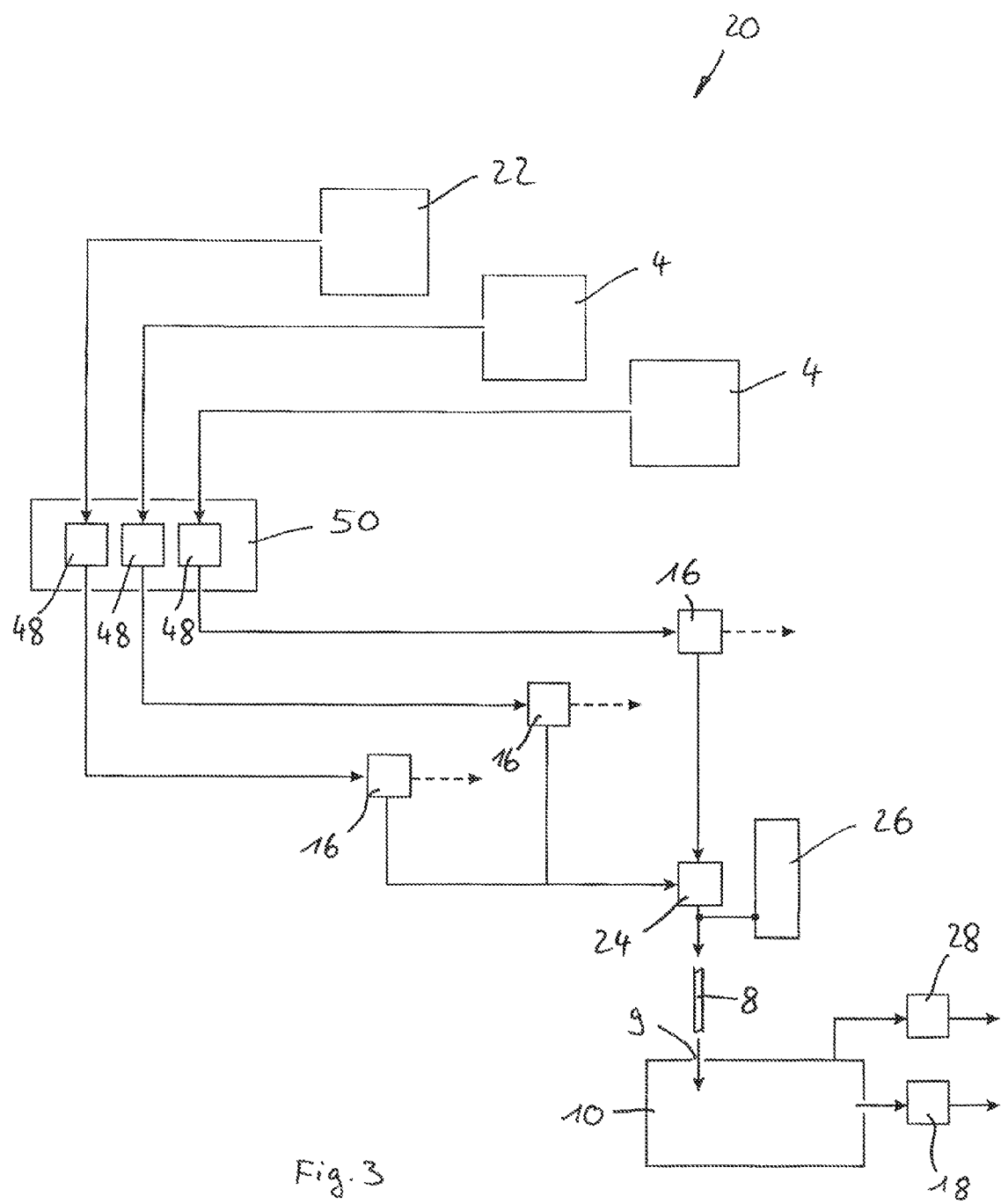
FIG. 3 shows a diagrammatic view of the system according to the invention based on a third exemplary embodiment.

FIG. 3 shows another modification in the form of a system 20 according to the invention, in which several internal combustion engines 4 and 22 may be used in combination as an exhaust gas source. In principle, exhaust gas may be tapped from as many internal combustion engines 4 and 22 as desired. Proceeding from standard redundancy requirements, however, it is probably sufficient to tap exhaust gas from two internal combustion engines 4 and 22 in aircraft systems in civilian aircraft according to the EASA or FAA Part 25. The number of used internal combustion engines 4 and 22 shown on FIG. 3 is only an example, and not intended to limit the invention to precisely this number.

Each of the internal combustion engines 4 and 22 is connected by a valve 16 with a compressor 24 used to convey exhaust gas from one or more sources into the exhaust gas line 8 in compressed form, so that the volume 10 may be exposed to exhaust gas. Preferably situated next to the compressor 24 as well is a pressure accumulator 26, which is used as a buffer storage, and connected with the compressor. By buffering the exhaust gas pressure achieved by the compressor 24, the compressor 24 need not be in continuous operation, making it possible to save electrical energy inside the vehicle.

Another special characteristic of the system 20 according to an embodiment of the invention is that the exhaust gas tapped from the internal combustion engines 4 and 22 is cooled by a respective exhaust gas cooler 48, wherein the exhaust gas coolers 48 are located in a fuel tank 50 designed as a "center tank", for example. At least in aircraft manufactured by AIRBUS, fuel is supplied to the engines by way of a center tank, which is connected with the wing tanks and auxiliary tanks. This means that a center tank is evacuated last, so that it has fuel usable as a heat sink for the longest time, making it possible to ensure sufficient cooling. As an alternative, the exhaust gas coolers may also be placed in an air stream, e.g., realized by means of a ram-air duct, but this would have to be assisted by an active fan unit while on the ground. In addition, an additional ram-air duct raises the air resistance, and hence the fuel consumption of the aircraft.

The exhaust gas outlet 12 may here also be closed by means of a valve 18. In addition, a second pressure relief valve 28 is arranged on the volume 10 in the depicted exemplary embodiment, serving to prevent excess pressure in the volume 10.

Figure 4:
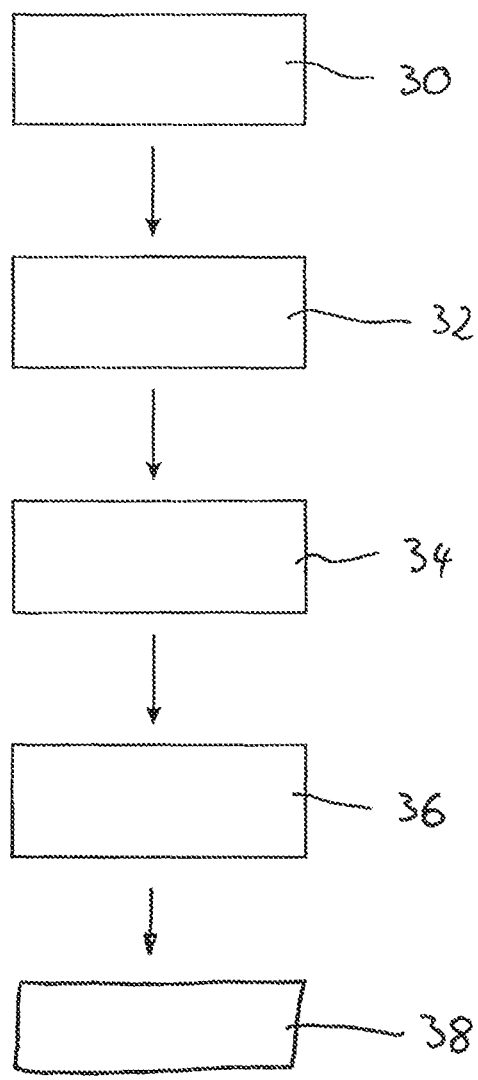
FIG. 4 shows a diagrammatic view of a block diagram of a method according to an embodiment of the invention.

FIG. 4 shows a diagrammatic block diagram with the basic outlines of the method according to an embodiment of the invention. By optionally opening 30 a valve 16, exhaust gas is tapped 32 and routed into an exhaust gas line 8. If desired, the exhaust gas may be compressed 34, to then be relayed 36 to the volume 10. As an option, a valve 18 may also be opened 38 to discharge the exhaust gas from the volume 10 into the environment.

Figure 5:
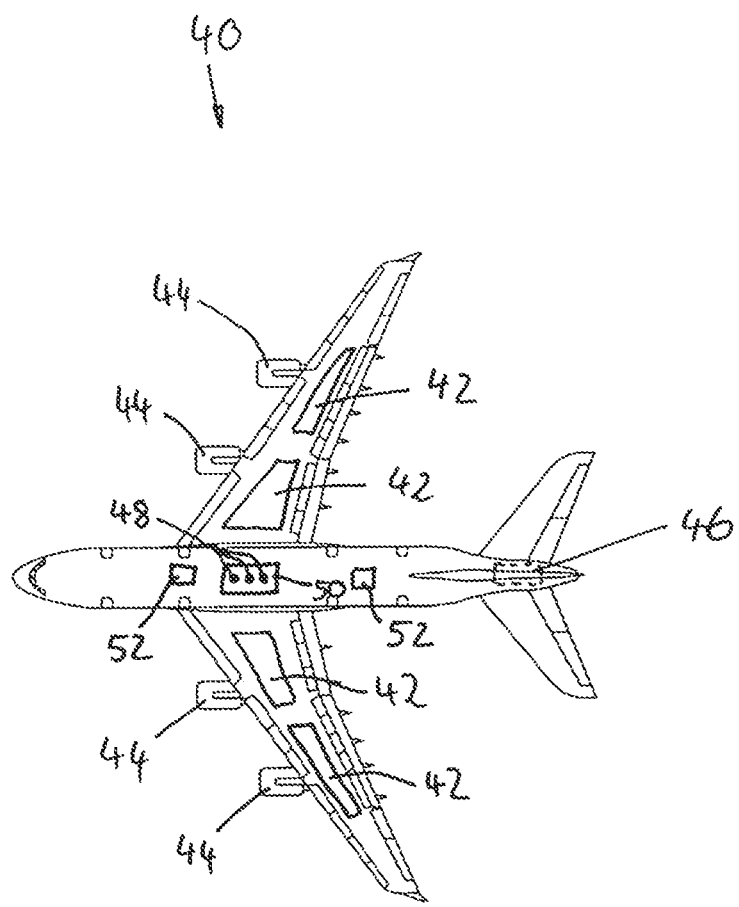
FIG. 5 shows an aircraft equipped with at least one system according to an embodiment of the invention.

FIG. 5 presents an exemplary aircraft 40, which has several fuel tanks 42 and several gas turbines 44 and 46. The gas turbine 46 could be designed as an auxiliary turbine, which serves to furnish the aircraft 40 on the ground with electrical, hydraulic and pneumatic energy in the absence of ground supply. According to an embodiment of the invention, the gas turbines 44 and 46 have exhaust gas extraction points 6, from which exhaust gas may be routed into the fuel tanks 42 and auxiliary tanks 52, contributing to the inerting process therein. It is not necessary for all engines 44 to 46 to have exhaust gas extraction points 6; only one, two, three or four engines 44 and 46 may also be equipped with exhaust gas extraction points 6. Cooling by means of an exhaust gas cooler 48 in a fuel tank 50 designed as a center tank could lower the exhaust gas temperature to a non-critical level.

This yields a particularly effective, simple and cost-effective possibility for inerting the fuel tank 42 and preventing an ignitable mixture. No separate fuel components are necessary to realize sufficient inerting.

The embodiments of the invention are not limited to equipping an aircraft with an inerting system; rather, all vehicles with internal combustion engines are capable of operating such an inerting system. In addition, let it be noted that "having" does not preclude any other elements or steps, and that "a" or "an" do not rule out a plurality. Let it further be noted that features described with reference to one of the above exemplary embodiments may also be used in combination with other features or steps from other exemplary embodiments described above. The reference numbers in the claims are not be construed as a limitation. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A system for inerting a volume in a vehicle having at least one internal combustion engine, comprising:
   at least one exhaust gas extraction point on the at least one internal combustion engine of the vehicle;
   an exhaust gas line coupled to the at least one exhaust gas extraction point for routing exhaust gas from the at least one exhaust gas extraction point to at least one volume;
   an exhaust gas cooler in communication with the exhaust gas line to cool the exhaust gas, the exhaust gas cooler located in a fuel tank of the vehicle;
   a first pressure relief valve coupled to the exhaust gas line downstream from the exhaust gas cooler to discharge exhaust gas when a permissible pressure has been exceeded in a respective one of the plurality of exhaust gas lines; and
   at least one exhaust gas inlet on the volume for introducing exhaust gas to generate a low-activity environment in the at least one volume.

2. The system of claim 1, further comprising a cleaning filter adapted to clean exhaust gas exiting the at least one exhaust gas extraction point.

3. The system of claim 2, wherein the cleaning filter is arranged between the at least one exhaust gas extraction point and the exhaust gas line.

4. The system of claim 1, further comprising a compressor in communication with the exhaust gas line upstream from the volume and downstream from the first pressure relief valve increase an exhaust gas pressure in the exhaust gas line.

5. The system of claim 4, further comprising a pressure accumulator located downstream from the compressor and in operative communication with the compressor that acts as a buffer storage for the pressurized exhaust gas.

6. The system of claim 1, further comprising a second exhaust gas extraction point of a second internal combustion engine, wherein the system is adapted to convey exhaust gas from the second exhaust gas extraction point into the exhaust gas line.

7. The system of claim 1, further comprising a second pressure relief valve arranged on the at least one volume to be inerted to discharge exhaust gas when a permissible pressure has been exceeded in the exhaust gas line.

8. The system of claim 1, further comprising at least one valve adapted to separate a connection between the exhaust gas line and the at least one exhaust gas extraction point.

9. A method for inerting a volume in a vehicle having an internal combustion engine, comprising the steps of:
   tapping exhaust gas from at least one exhaust gas extraction point of the internal combustion engine of the vehicle and routing the exhaust gas through an exhaust gas line;
   cooling the exhaust gas with an exhaust gas cooler located in a fuel tank of the vehicle;
   discharging pressure in the exhaust gas line with a first pressure relief valve when a permissible pressure has been exceeded in the exhaust gas line;
   compressing the exhaust gas in a compressor located upstream from the volume and downstream from the first pressure relief valve;
   buffering the exhaust gas with a pressure accumulator located downstream from the compressor; and
   introducing the exhaust gas into the volume.

10. The method of claim 9, further comprising the step of filtering the exhaust gas.

11. A vehicle, comprising:
    a plurality of internal combustion engines;
    at least one volume; and
    an inerting system adapted to inert the at least one volume, the inerting system comprising:
      an exhaust gas extraction point on each of the plurality of internal combustion engines of the vehicle;
      a plurality of exhaust gas lines each coupled to a respective one of the exhaust gas extraction points to route exhaust gas from the respective exhaust gas extraction point to the at least one volume;
      a plurality of exhaust gas coolers each in communication with a respective one of the plurality of exhaust gas lines to cool the exhaust gas, the plurality of exhaust gas coolers located in a fuel tank of the vehicle;
      a plurality of first pressure relief valves each coupled to a respective one of the plurality of exhaust gas lines downstream from the plurality of exhaust gas coolers to discharge exhaust gas when a permissible pressure has been exceeded in a respective one of the plurality of exhaust gas lines;
      a compressor in communication with the exhaust gas lines upstream from the at least one volume and downstream from the plurality of first pressure relief valves to pressurize the exhaust gas in the exhaust gas lines;
      a pressure accumulator located downstream from the compressor that acts as a buffer storage for the pressurized exhaust gas; and
      at least one exhaust gas inlet on the at least one volume to introduce pressurized exhaust gas to generate a low-activity environment in the at least one volume.

12. The vehicle of claim 11, the inerting system further comprising a cleaning filter adapted to clean exhaust gas exiting the at least one exhaust gas extraction point.

13. The vehicle of claim 12, wherein the cleaning filter is arranged between the at least one exhaust gas extraction point and the exhaust gas line.

* * * * *